(12) United States Patent
Fairbanks (10) Patent No.: US 12,212,803 B2
(45) Date of Patent: Jan. 28, 2025

(54) SYSTEM AND METHOD FOR ACQUIRING INTERACTIVITY FOR OBJECTS APPEARING IN MEDIA CONTENT CAPTURED THROUGH AN IMAGE CAPTURE DEVICE OF A USER DEVICE

(71) Applicant: Neal C. Fairbanks, Livonia, MI (US)

(72) Inventor: Neal C. Fairbanks, Livonia, MI (US)

(*) Notice: Subject to any disclaimer, the term of this patent is extended or adjusted under 35 U.S.C. 154(b) by 47 days.

(21) Appl. No.: 18/221,452

(22) Filed: Jul. 13, 2023

(65) Prior Publication Data

US 2024/0022784 A1 Jan. 18, 2024

Related U.S. Application Data

(60) Provisional application No. 63/388,764, filed on Jul. 13, 2022.

(51) Int. Cl.
| | |
|---|---|
| *H04N 21/431* | (2011.01) |
| *H04N 21/44* | (2011.01) |
| *H04N 21/472* | (2011.01) |
| *H04N 21/854* | (2011.01) |

(52) U.S. Cl.
CPC ... *H04N 21/4312* (2013.01); *H04N 21/44008* (2013.01); *H04N 21/47205* (2013.01); *H04N 21/85406* (2013.01)

(58) Field of Classification Search
CPC ......... H04N 21/4312; H04N 21/44008; H04N 21/47205; H04N 21/85406
See application file for complete search history.

(56) References Cited

U.S. PATENT DOCUMENTS

| | | |
|---|---|---|
| 5,561,708 A | 10/1996 | Remillard |
| 5,708,845 A | 1/1998 | Wistendahl et al. |
| 6,002,394 A | 12/1999 | Schein et al. |
| 6,496,981 B1 | 12/2002 | Wistendahl et al. |
| 6,636,237 B1 | 10/2003 | Murray et al. |
| 6,675,174 B1 | 1/2004 | Bolle et al. |

(Continued)

FOREIGN PATENT DOCUMENTS

| | | |
|---|---|---|
| AU | 2012205152 A1 | 5/2013 |
| CA | 2806881 A1 | 2/2012 |

(Continued)

*Primary Examiner* — Mulugeta Mengesha
(74) *Attorney, Agent, or Firm* — Howard & Howard Attorneys PLLC (57) ABSTRACT

A system and method for enabling interactive content for objects appearing in media content captured through an image capture device of a user device is disclosed. A portable package associated with the media content is provided to receive interactive elements corresponding to the objects and object metadata. The media content is associated with an identifiable feature that is present and identified from within a field of view of the image capture device. A request is received for the portable package associated with the media content and the portable package is delivered to the user device based on the request. Next, a selection event is received and the portable package is parsed to determine whether the selection event corresponds to any interactive element. Object metadata is retrieved if the selection event corresponds to the interactive element so that the additional information is displayable to the user on the user device.

19 Claims, 7 Drawing Sheets

(56) References Cited

U.S. PATENT DOCUMENTS

| | | | |
|---|---|---|---|
| 7,325,013 B2 | 1/2008 | Caruso | |
| 7,653,921 B2 | 1/2010 | Herley | |
| 7,769,708 B2 | 8/2010 | Caruso | |
| 7,809,154 B2 | 10/2010 | Lienhart et al. | |
| 7,870,592 B2 | 1/2011 | Hudson et al. | |
| 7,895,325 B2 | 2/2011 | Van Vleet et al. | |
| 7,962,367 B1 | 6/2011 | Fuisz et al. | |
| 8,065,615 B2 | 11/2011 | Murray et al. | |
| 8,073,194 B2 | 12/2011 | Lienhart et al. | |
| 8,090,579 B2 | 1/2012 | DeBusk et al. | |
| 8,255,279 B2 | 8/2012 | Fuisz et al. | |
| 8,312,486 B1 * | 11/2012 | Briggs | H04N 21/4725 725/32 |
| 8,392,821 B2 | 3/2013 | DeMarco et al. | |
| 8,418,198 B2 | 4/2013 | Cansler et al. | |
| 8,533,753 B2 | 9/2013 | Briggs et al. | |
| 8,549,555 B2 | 10/2013 | Briggs et al. | |
| 8,782,690 B2 | 7/2014 | Briggs et al. | |
| 8,843,959 B2 | 9/2014 | McMaster et al. | |
| 8,850,477 B2 | 9/2014 | Schein et al. | |
| 8,893,173 B2 | 11/2014 | Briggs et al. | |
| 9,189,818 B2 | 11/2015 | McClements, IV | |
| 9,247,309 B2 | 1/2016 | Oztaskent et al. | |
| 9,258,597 B1 | 2/2016 | Clayton | |
| 9,516,251 B2 | 12/2016 | Welch | |
| 9,560,415 B2 | 1/2017 | Good et al. | |
| 9,596,515 B2 | 3/2017 | Witenstein-Weaver | |
| 9,639,532 B2 | 5/2017 | Raichelgauz et al. | |
| 9,705,728 B2 | 7/2017 | Bridges | |
| 9,883,249 B2 | 1/2018 | Taylor et al. | |
| 9,888,289 B2 | 2/2018 | Gross | |
| 9,936,030 B2 | 4/2018 | Laliberte | |
| 9,936,238 B2 | 4/2018 | Grubbs et al. | |
| 9,973,819 B1 | 5/2018 | Taylor et al. | |
| 10,021,458 B1 * | 7/2018 | Taylor | H04N 21/2187 |
| 10,146,412 B2 | 12/2018 | Jung et al. | |
| 10,477,287 B1 | 11/2019 | Fairbanks | |
| 11,042,753 B2 | 6/2021 | Moore et al. | |
| 11,049,176 B1 * | 6/2021 | Drynan | G06Q 20/123 |
| 2002/0059117 A1 | 5/2002 | Yoch et al. | |
| 2003/0149983 A1 | 8/2003 | Markel | |
| 2004/0109087 A1 | 6/2004 | Robinson et al. | |
| 2005/0069225 A1 | 3/2005 | Schneider et al. | |
| 2005/0137958 A1 | 6/2005 | Huber et al. | |
| 2006/0052750 A1 | 3/2006 | Lenker et al. | |
| 2007/0124762 A1 | 5/2007 | Chickering et al. | |
| 2008/0066136 A1 | 3/2008 | Doral et al. | |
| 2008/0126191 A1 | 5/2008 | Schiavi | |
| 2008/0140523 A1 | 6/2008 | Mahoney et al. | |
| 2009/0271819 A1 | 10/2009 | Cansler et al. | |
| 2009/0276805 A1 | 11/2009 | Il et al. | |
| 2011/0035382 A1 | 2/2011 | Bauer et al. | |
| 2011/0052144 A1 | 3/2011 | Abbas et al. | |
| 2011/0191699 A1 | 8/2011 | Cunningham et al. | |
| 2012/0067954 A1 | 3/2012 | Moganti et al. | |
| 2012/0151347 A1 | 6/2012 | McClements, IV | |
| 2012/0167145 A1 | 6/2012 | Incorvia | |
| 2012/0167146 A1 | 6/2012 | Incorvia | |
| 2012/0206647 A1 | 8/2012 | Allsbrook et al. | |
| 2013/0074139 A1 * | 3/2013 | Cope | H04N 21/858 725/114 |
| 2013/0174195 A1 | 7/2013 | Witenstein-Weaver | |
| 2014/0047483 A1 | 2/2014 | Fairbanks | |
| 2014/0255003 A1 | 9/2014 | Abramson | |
| 2014/0259056 A1 | 9/2014 | Grusd | |
| 2015/0113557 A1 | 4/2015 | Kim et al. | |
| 2015/0121439 A1 | 4/2015 | Wellen et al. | |
| 2015/0177940 A1 | 6/2015 | Trevino et al. | |
| 2017/0017382 A1 | 1/2017 | Tobin et al. | |
| 2018/0288496 A1 | 10/2018 | Ade et al. | |
| 2019/0253761 A1 | 8/2019 | Yusupov et al. | |
| 2022/0053233 A1 | 2/2022 | Baxter et al. | |
| 2022/0167067 A1 | 5/2022 | Fairbanks | |
| 2022/0351242 A1 | 11/2022 | Garcia | |

FOREIGN PATENT DOCUMENTS

| | | |
|---|---|---|
| EP | 3246868 A1 | 11/2017 |
| IN | 2011MU01896 A | 6/2011 |
| IN | 202044029009 | 7/2019 |
| IN | 202021008661 A | 9/2021 |
| JP | 2019531548 A | 10/2019 |
| KR | 20120124125 A | 11/2012 |
| KR | 20140001035 A | 1/2014 |
| KR | 101436413 B1 | 9/2014 |
| KR | 20190081367 A | 7/2019 |
| KR | 20200132445 A | 11/2020 |
| WO | 2012045317 A1 | 4/2012 |
| WO | 2017011084 A1 | 1/2017 |
| WO | 2018174637 A1 | 9/2018 |

* cited by examiner

SYSTEM AND METHOD FOR ACQUIRING INTERACTIVITY FOR OBJECTS APPEARING IN MEDIA CONTENT CAPTURED THROUGH AN IMAGE CAPTURE DEVICE OF A USER DEVICE

FIELD OF THE INVENTION

The subject invention relates to a system and method for enabling interactive content on a user device for objects appearing in media content captured through an image capture device of the user device.

BACKGROUND

Today, media content may be broadcasted through streaming devices. These streaming devices deliver audio, video, and/or other media over the internet without a multiple-system operator being involved in control and/or distribution of the media. For example, such media is distributed from one or more third parties to an end user through an internet-enabled device. Examples of such streaming devices include Roku devices, Apple TV devices, Samsung Smart TV devices, Google TV devices, Chromecast devices, Amazon Fire TV devices, and the like. While examples disclosed above generally refer to streaming devices, such examples may apply to any media delivered via satellite, cable television, and/or any other type of transmission for delivering multimedia content.

Although each of these streaming devices provide a controller (via a physical controller or a mobile application paired to the streaming device) to control the media content, these controllers are limited in their use and do not access information associated with objects presented in the media content. Instead, these controllers may allow the user to control streaming of the content by allowing users to press play, fast-forward, rewind, stop, and the like. These streaming devices may also allow the user to view information about the media content such as summaries or captions of the content. Users may download a mobile application for the respective streaming device and pair the mobile application to the streaming device in order to control the content. However, such control is limited and only provides superficial information to the user and the information is not being directly associated with objects in the media content.

There have been prior attempts to provide interactivity to objects in media content, streamed, recorded, or live. Prior attempts traditionally require physical manipulation of the object or the media content. For example, some prior methods require the media content to be edited frame-by-frame to add interactivity to the object, which often requires manipulation of the actual media content itself. But, manipulating the media content itself is largely undesirable because of the large number of individual frames. Other prior art discloses editing only selected frames of the media stream, instead of editing each of the individual frames. However, such approaches would still take considerable time and effort even for a most skilled editor.

Other approaches are shown in United Patents Patent Application Publications 2014/0047483 and 2015/0177940. Each of these methods define object parameters for objects present in media content and the parameters are stored in a database separate from the media content and separate from the device that is playing the media content. When the user interacts with the video, in order to determine if the object is located at that time and location, it is necessary to communicate with the database. Still another approach is shown in WO2017/011084, and corresponding United States Patent Application Publication No. 2017/0017382, which discloses a system and method for interaction between touch points on a graphical display, and specifically for the selection of objects while viewing media content. Such systems have drawbacks if the bandwidth is limited between the user device and the database or if a content provider will not allow access outside of its network. If millions of users are selecting objects at nearly the same time, the bandwidth to make the round trip is too extensive and performance is poor. The performance is further limited if analytics are being transmitted at the same time. Further, the systems tend to be computationally intensive which results in the implementation being limited or difficult.

Further, the use of image capture devices, such as cameras, on mobile devices to retrieve information about object has become increasingly common. In one example, the use of QR codes has become common for sharing information. A user will scan the QR code or place the QR code in the field of view of the camera, and the user device will prompt to open a website that is encoded within the QR code. Other examples include such applications as Google Goggles that allows for scanning of an object and a Google image search will be conducted to find information about the object. While these applications are useful, there remains opportunity to more fully utilize and integrate such approaches to product marketing and advertising. This is especially true for product placement that occurs in live and recorded media content.

Accordingly, there remains a need in the art to address one or more of the challenges outlined above.

SUMMARY

The subject invention provides a method for enabling interactive content on a user device for objects appearing in media content captured through an image capture device of the user device. A portable package associated with the media content is provided that includes at least one shape file to receive interactive elements corresponding to objects visually present in the media content and object metadata that is associated with the interactive element. An identifiable feature is associated with the media content and the identifiable feature is identified from within a field of view of the image capture device. A request is received for the portable package associated with the media content in response to identifying the identifiable feature and the portable package is delivered to the user device based on the request. Next, a selection event that occurred on the user device that includes a selection time and a selection coordinate is received and the shape file is parsed to determine whether the selection event corresponds to any interactive element. The object metadata is retrieved if the selection event corresponds to the interactive element so that the additional information is displayable to the user on the user device.

The subject invention further provides another method for enabling interactive content on a user device for objects appearing in media content that is captured through an image capture device of the user device. First, a portable package is provided that is associated with the media content. The portable package includes at least one shape file to receive interactive elements corresponding to objects visually present in the media content and object metadata that is associated with the interactive element. Then, a field of view presented from the image capture device is analyzed for at least one portion of a boundary of the media content and an identifiable feature is identified that is within a field of view of the image capture device. The identifiable feature is associated, or linked, with the media content. A location of the identifiable feature is determined relative to the at least one portion of the boundary of the media content. A request for the portable package that is associated with the media content is received in response to identifying the identifiable feature and the portable package is delivered to the user device based on the request. Next, a selection event that occurred on the user device is received that includes a selection time and a selection coordinate. The portable package is parsed to determine whether the selection event corresponds to any interactive element, wherein parsing the shape file includes the step of translating the selection event based on the location of the identifiable feature relative to the boundary to determine if the selection event corresponds to the interactive element. Then, the object metadata is retrieved if the selection event corresponds to the interactive element so that the additional information is displayable to the user on the user device.

Accordingly, the method advantageously provides interactivity to objects in the media content to allow the user to see additional information such as advertisements in response to clicking the object on the user device. The subject invention overcomes the drawbacks that are present in the related systems. First, the subject invention is able to provide interactivity for any media content that has interactive content stored in a portable package regardless of the user device that is viewing or capturing the media content. The interactivity can be provided for media content that is recorded or that is live, again regardless of the user device that is viewing or capturing the media content. So long as the user device has an image capture device, such as a camera, to capture or view the media content, and the media content is associated with a portable package, the interactive content can be retrieved and displayed on the user device. Another advantage is the interactive content can be scaled and adjusted based on how the media content is captured or viewed within a field of view of the user device. The subject invention also accommodates different device types, resolution, and orientation so that the interactive elements remain aligned with the objects. The subject invention also provides for automatic creating and tracking of objects within a smaller field of view which improves accuracy and shortens computational time and lessens computations requirements. In other words, the subject invention successfully provides interactive media content that consumes less bandwidth for user devices, such as mobile phones.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Referring to the Figures, wherein like numerals indicate like parts throughout the several views, a system 100 and a method for enabling interactivity are shown throughout the Figures. The system 100 provides interactive content that includes interactive elements 102 associated with objects 104 present in media content 106. The media content 106 is shown on a separate display 108 to a user 110. The user 110 has a user device 114 with an image capture device 118 and the user 110 captures the media content 106 through the image capture device 118 such that the media content 106 is visible on a screen of the user device 114. It will be appreciated that the user device 114 includes a processor that executes code as one of ordinary skill would appreciate to carry out the subject invention so that additional disclosure is not required. As would be further understood, the user device 114 generally also includes, although not shown in the Figures, memory (RAM, ROM), and storage media. The user 110 is able to access the information on the user device 114 about the object 104 that is present in the media content 106, as the media content 106 is being displayed on the display 108, which is separate from the user device 114.

In general, the system 100 includes a package server 112 that provides the interactive content including the interactive elements 102 for the objects 104 present in the media content 106, as will be described below. The package server 112 and the user device 114 are in communication with one another to transmit a portable package to the user device 114 based on media content 106 that is displayed on the display 108. The package server 112 also generally includes a database 134, an applications layer 136, a services layer 138, and a web server 140.

The database 134 stores business rules, response rules, instructions and/or pointer data for enabling interactive and event driven content. The business and response rules may be based on the selection habits of the user and can provide feedback on how successful a marketing campaign was and/or what should be done next in the business. The database 134 may be comprised of multiple databases. The applications layer 136 and the services layer 138 may include localization, scheduled jobs, notification services, media processing, reporting, web services, geo-detection, event analyzer, package creation, and item recognition. The database 134 also stores a content key identifier (not shown) which defines whether the media content is live or recorded. Live events would have the content key identifier represented as a live content key and recorded events, or live events that have been recorded, are represented as a recorded content key. Recorded content may be referred to as "replayed" as known to those of ordinary skill in the art. One example of using the content key identifier is disclosed in United States Patent Application Publication No. 2022/0167067, which is incorporated herein by reference. Examples of a content key could be a public key such as a URL addresses or public code. Examples of a private key cold be an encrypted MD5 hash value or private code. The web server 140 is responsible for communication of events and actions between the package server 112 and viewer applications via a GUI and/or event area of the web server 140. The web server 140 may include components which may be used to communicate with one or more computing platforms and/or user devices 114 remotely over a network.

The user 110 may access the information about the object 104 via the user device 114. The user device 114 loads and executes a package file from the portable package to enable and/or access the interactive content. The package file works with industry standard specifications for the user device 114 to provide interoperability. In other words, the user 110 may view the media content 106 through the user device 114 and access interactive content on the user device 114. For example, the user 110 may interact with the objects 104 through or on the user device 114. In some configurations, one or more identifiable features 116 may be detectable by the user device 114 to indicate to the user device 114 that interactive content is associated with objects 104 present in the media content 106. The identifiable features 116 may be associated with a specific media content 106 and linked with a specific package file. Interaction and accessing information with the user device 114 with be discussed in greater detail below. It is to be appreciated that the terms "user" and "viewer" may be used interchangeably to refer to the user or viewer that is viewing the media content 106 on the user device.

Figure 1:
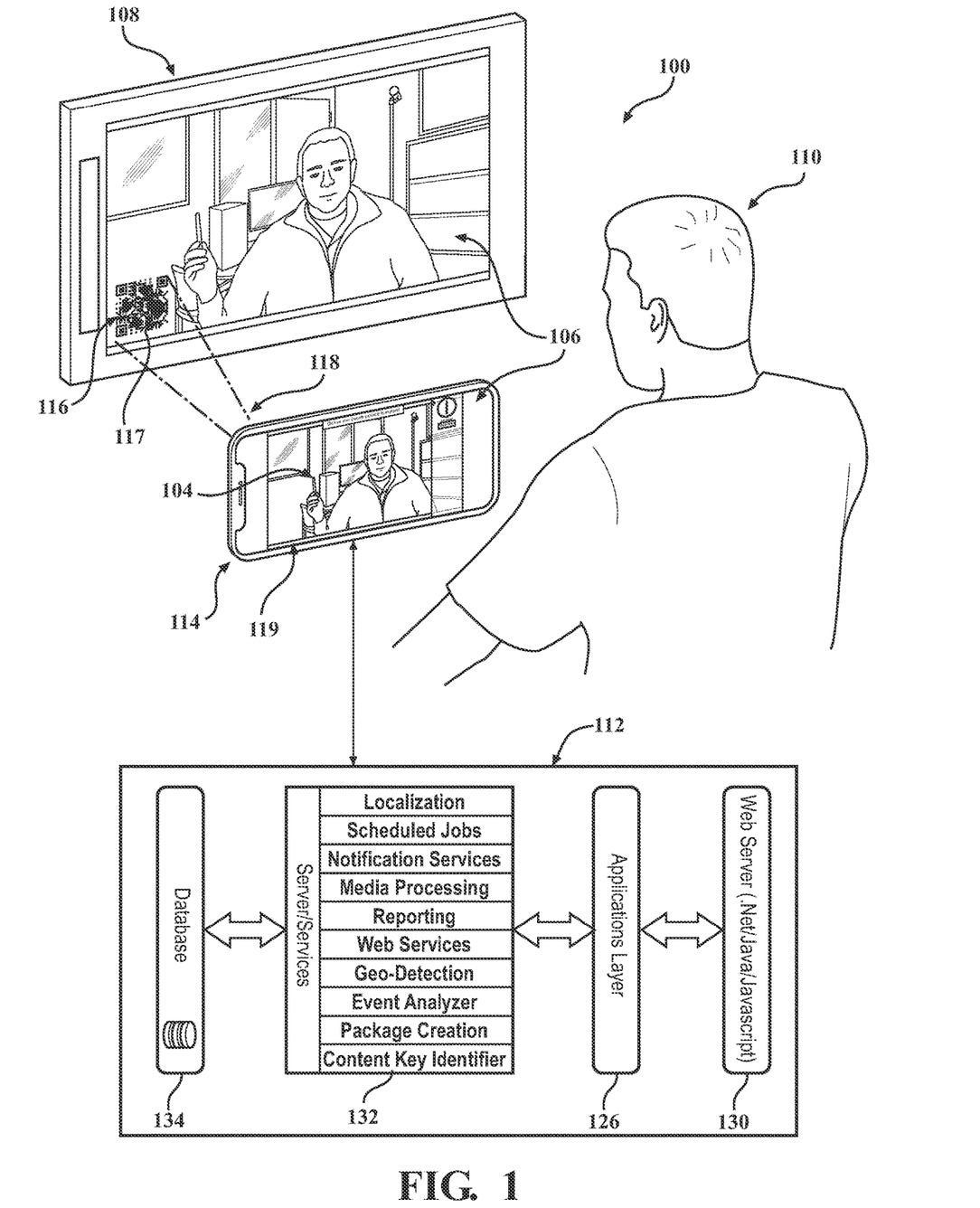
FIG. 1 is a schematic representation of one configuration of a system for enabling interactive elements for objects to a user with a user device when the objects appear on a separate display.
Figure 5:
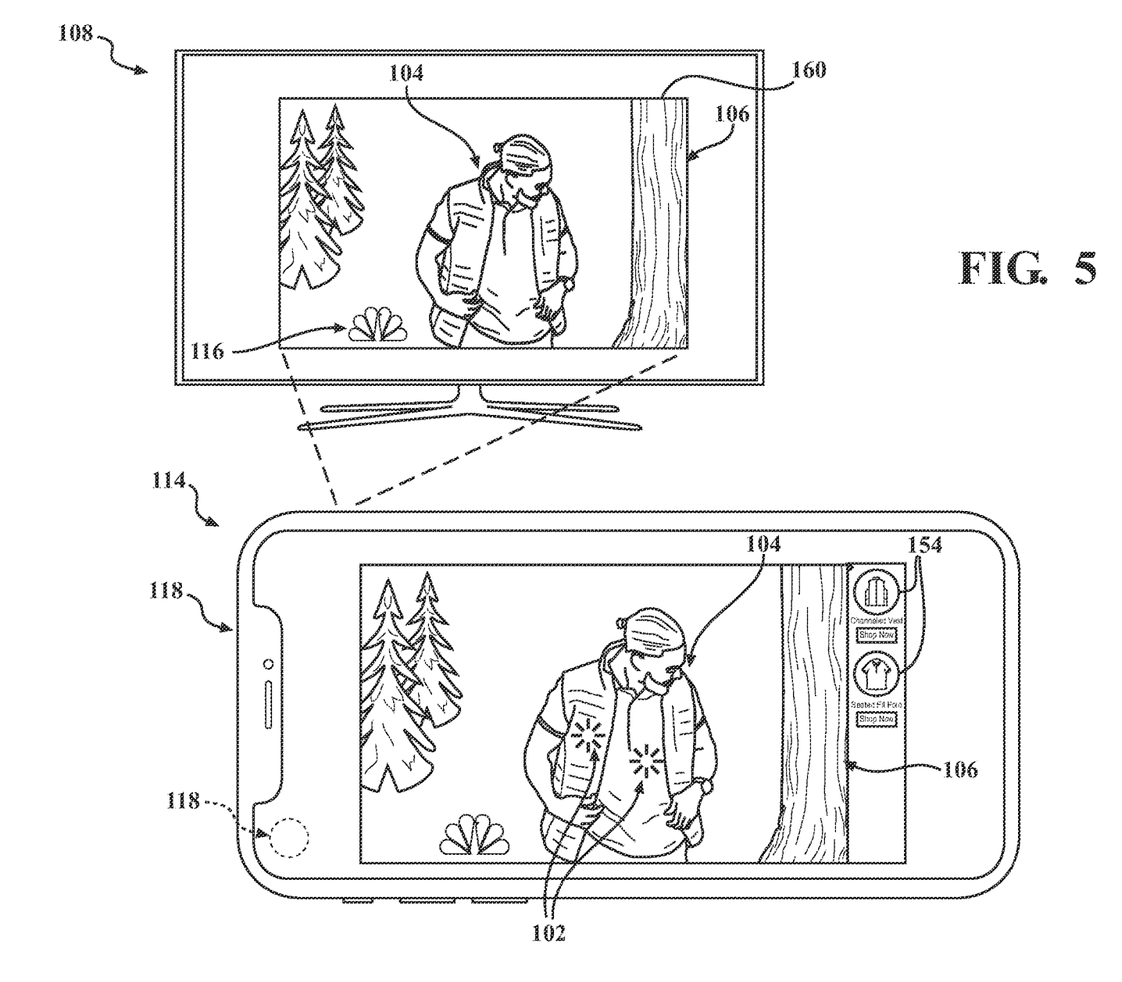
FIG. 5 is a schematic representation of one configuration of a display showing media content and the user device accessing the media content having interactivity enabled and objects having been selected.

The media content 106 may be viewable on both the user device 114 and the display 108 to be viewed by the user 110. Examples of the media content 106 include, but are not limited to, any recorded video, recorded or live television programs, movies, sporting events, news broadcasts, and streaming videos. Transmission of the media content 106 may be accomplished by satellite, network, or the like. The media content 106 may be streamed such that it is continuously received by and presented to the user 110 while being continuously delivered by a content provider. Media content 106 may be viewable on any type of display 108. For example, as shown in FIG. 1, the display 108 presents media content 106 on a television. In another example, as shown in FIG. 5, the display 108 presents media content 106 on a monitor. Other configurations are contemplated without deviating from the subject invention. It will further be appreciated that the type of object 104 is not limited to objects 104 illustrated throughout the Figures and may be any object in media content 106. The object 104 may be defined as any logical item in the media content 106 that is identifiable by the user 110. Examples of suitable objects 104 include, but are not limited to, clothes, food items, furniture, corporate logos, vehicles, locations, buildings, and the like. Each one of these objects 104 may have information associated therewith, such as, but not limited to, manufacturer, price, reviews, availability or the like. If the object is a location, then the associated information may include, without being limiting, population, average weather conditions for the time of year, etc.

It will be appreciated that media content 106 is not limited to content presented through or on the display 108. In other words, media content 106 may include a live in-person event wherein the user 110 may view the content presently through the image capture device 118 of the user device 114. In some configurations, the display 108 is software that is being executed or processed by a processor and memory associated with the display. The display 108 is typically written in accordance with industry standard specifications, such as HTML5, programming for java script, or the like depending on the device or browser that loads the display 108. The user device 114 may display the media content 106 through the image capture device 118 software or interface in a similar manner using similar techniques. Alternatively, the user device 114 may use an applet, program, viewer application, layer, etc., to display the media content 106 on the user device 114. As shown in FIG. 1, the user device 114 is mirroring the display 108 in the camera application. Instead of mirroring the display 108, the system 100 may launch the program and load the media content 106 in the program such that the media content 106 is not being mirrored but is playing directly on the user device 114. The subject invention extends and enhances these specifications to provide the interactivity so that it is useable at low bandwidth and without having to continuously or repeatedly access remote databases for interactivity.

The user 110 may access the media content 106 via various types of user devices 114 such as smart phones, laptop or desktop computers, tablets, and the like, so long as the user device 114 can capture the media content 106, such as through the image capture device 118. The system 100 is particularly useful for smart phones, mobile phones, and tablets where the user 110 is capturing the media content 106 thereon. The user device 114 includes one or more image capture devices 118 and one or more output peripherals 121. The output peripherals 121 may include a display screen, speaker, etc. on the user device 114. The user device 114 is equipped to view and capture media content 106. Here, the image capture device 118 includes a camera 119. Although the image capture device 118 may be referred to as the camera 119, it will be appreciated that other image capture devices are contemplated. It is to be appreciated that the user device 114 includes input peripherals which can include a touch screen, keyboard, etc., to provide inputs to the user device 114 from the user 110. The image capture device 118 or output peripherals 121 (or the user device 114 itself) may also comprise an interface system by which signals sampled by the camera/microphone are converted into digital data suitable for processing by the system 100.

Figure 6:
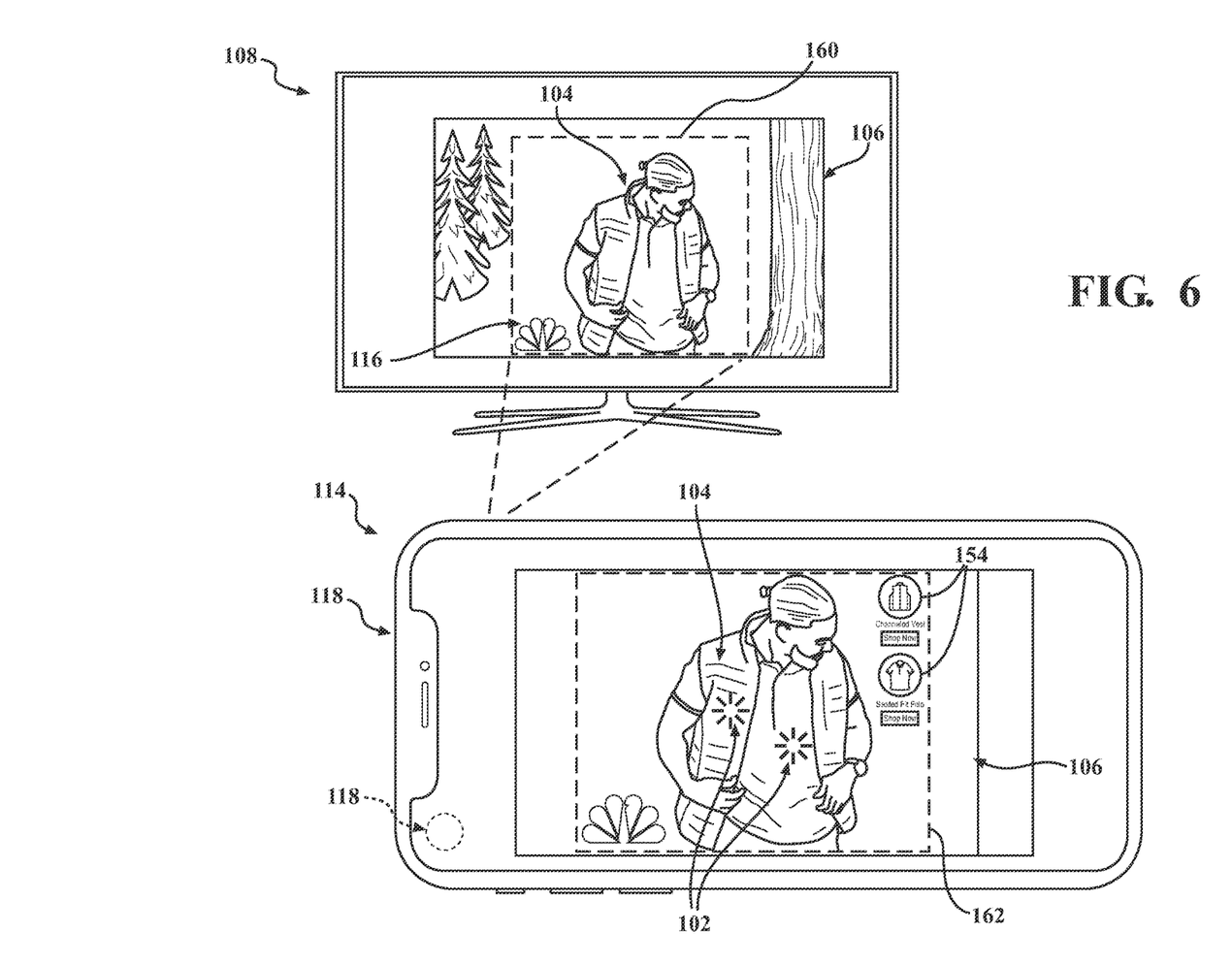
FIG. 6 is a schematic representation of another configuration of a display showing media content and the user device accessing the media content having interactivity enabled and objects having been selected.

In order for the user device 114 to access interactive content for objects 104 that are displayed in the media content 106 through the user device 114, the media content 106 needs to be identified to the user device 114 and the system 100 determines if interactivity exists for the media content 106. In one configuration, the camera 119 of the user device 114 is directed toward the display 108 to view the media content 106 presented thereon. The user device 114 analyzes data received from the camera 119 and identifies the media content 106. One manner of identifying the media content 106 is by the user 110 panning the camera 119 across the display 108 such that the display 108 is in the field of view of the camera 119 which then identifies the media content 106. In one embodiment, the media content 106 may define a boundary 160 that is captured within the field of view of the camera 119 for analyzing the media content 106. As shown in FIG. 5, the boundary 160 is coextensive with the media content 106 shown on the display 108. It is to be appreciated, that if the display 108 is a TV, such as in FIG. 1, the boundary 160 could be the edge of the TV. Referring to FIG. 6, the field of view of the camera 119 may include a boundary box 162 for aligning the display 108 therein or the camera 119 may automatically define the boundary box 162 based on the boundary 160 of the display 108 using currently available software to align within the boundary box 162. If the boundary box 162 is smaller than the entire area of the display 108, then the image capture device 118 may capture less than the entire area within the boundary box 162, as shown in FIG. 6. One advantage of capturing less than the entire display 108 is that it provides a more stable image for analysis eliminate movement of the user device 114 relative to the display 108. This is particularly helpful when the media content 106 is being mirrored on the user device 114.

The media content 106 is then identified by the identifiable feature 116. Even if the display 108 is off-center from the field of view of the camera 119, so long as the identifiable feature 116 is visible, interactivity can be supplied to the user device 114. In certain embodiments, the field of view from the image capture device 118 is dynamically captured to compensate for movement of the user device 114 while the media content 106 is being captured. By dynamically capturing the field of view, the system 100 may analyze less than an entire field of view provided by the image capture device 118. For instance, the system 100 may analyze no more than ninety percent of the field of view provided by the image capture device 118 or it may focus on a portion less than the entire field of view provided by the image capture device 118. In this manner, the capturing of the media content 106 remains focused and steady within the output peripheral 121 of the user device 114 and allows for easier selecting of objects 104. Additionally, dynamically capturing also includes accounting for skew or perspective of the user device 114 relative to the media content 106 when it is being captured. The presence of the identifiable feature 116 and the boundary allow for the system 100 to accommodate and adjust based on any potential skew or perspective that is present.

The identifiable feature 116 may be a code 117, which may be any machine-readable code including, but not limited to, a QR code, a serial number, a UPC code, a barcode, an image, etc. In other configurations, the identifiable feature 116 may be based on any type of image in the media content 106 including, but not limited to, symbols, icons, numbers, text, logos, drawings, etc. The identifiable feature 116 may also be associated with any product and/or object including the size, shape, color, and the like of the product and/or object. The identifiable feature 116 may also include information related to time, location, weather, direction, and date associated with the media content 106. Preferably, the identifiable feature 116 would be located in the same vicinity, such as a fixed location, for simplified detection by the system 100.

As another example, the identifiable feature 116 may be a combination of the above, such as the network logo on the display 108 and the time that the user device 114 is capturing the media content 106. The system 100 determines what media content 106 would be displayed at that time and what media content 106 is associated with the logo. The system 100 then delivers the portable package for the identified media content 106 to the user device 114 to enable interactivity, if present. Alternatively, the user 110 may select the object 104 showing on the user device 114, then the coordinates of the selection are parsed through the portable package, and if interactivity is present, the information for the object 104 is provided on the user device 114. In a similar manner, in connection with a live event, the system 100 can use identifiable features 116 such as monuments, team and player names, logos, and the like to identify the information.

Once the media content 106 is identified, interactive content is provided to the user device 114 based on selections from the user 110 and whether interactivity is present in the portable package that is associated with the media content 106. If there is any interactive content, the user device 114 accepts and/or receives inputs or selections from the user 110 through and/or with the user devices 114 to access information related to the selection. In one embodiment, the user device 114 receives the portable package associated with the media content 106 to enable interactivity. In another embodiment, the user device 114 transmits selections from the user 110 which is parsed through the portable package, and if the object 104 was present at the selection, information is provided. As will be described below, the user 110 is able to click, or select, or otherwise interact through the user device 114.

Figure 2:
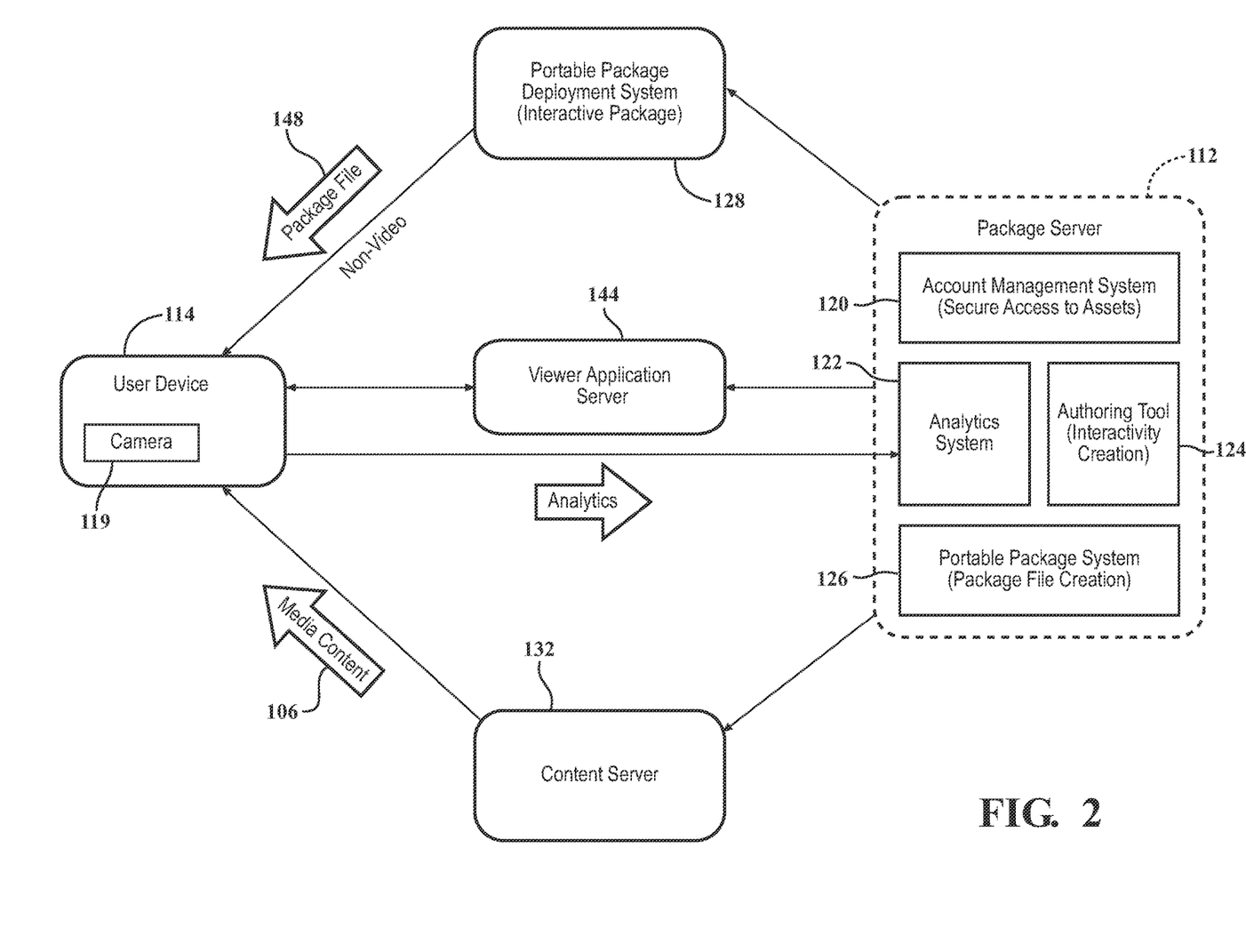
FIG. 2 is a schematic representation of one configuration of the system for creating and distributing portable packages to the user device to display interactivity for the media content.

Referring back to FIG. 2, the package server 112 may further include an account management system 120, an analytics system 122, an authoring tool 124, a portable package system 126, and a portable package deployment system 128. The package server 112 includes package file(s) associated with media content 106 displayed on the display 108. The portable package system 126 assembles the necessary components in a raw, native language, such as XML, that can be used for further processing or revising. The portable package deployment system 128 converts the portable package into machine language and includes various different types of code that allows the portable package to work with any type of device. The portable package deployment system 128 deploys recorded portable packages, initial portable packages, final portable packages, and package updates. It will be appreciated that, generally, the portable packages may include similar data or information at different times and under different circumstances or the data and information may be the same depending on the source of the media content. For example, if there is only recoded media content, an initial portable package may be created and at the end of the recorded media content, the recorded portable package is created. For live media content, an initial portable package could be created (even if empty), and during the actual live event, package updates are created. At the conclusion, a recorded portable package is created that is based on or includes the initial portable package and any package updates. This recorded portable package could be an altogether separate file from the initial portable package or simply a combination of them.

The package server 112 is in communication with the authoring tool 124. The portable package deployment system 128 and a content server 132 may be separate from the package server 112. Although the portable package deployment system 128 and the content server 132 are illustrated as being separate from the package server 112, it will be understood that the portable package deployment system 128 and content server 132 may be separate from or integrated with the package server 112 in some configurations. Additionally, the media content 106 may not necessarily be transmitted directly to the user device 114, when the media content 106 is simply mirrored on the user device 114. However, if the media content 106 is retrieved to the user device 114, it may be played locally. Other configurations are contemplated. The user device 114 is in communication with the package server 112 such that the user device 114 is configured to transmit and receive from the package server 112, such as portable packages, object information, or selection information. The portable package may reside in the package server 112 until the portable package is needed by the user device 114. The portable package includes the package file including interactive content which will be discussed below. The media content 106 may be stored separately from the package file until it is accessed through and loaded into user device 114, if appropriate. In one embodiment, once the identifiable feature 116 has identified the media content 106, a player may open on the user device 114 and play the media content 106 thereon such that the media content 106 is no longer being captured through the image capture device 118 of the user device 114. Alternatively, the media content 106 may merely continue to be visible on the user device 114 as captured by the image capture device 118.

The content server 132 is in communication with the package server 112 and/or the portable package deployment system 128. Here, the package server 112 transmits and receives signals or information between the portable package deployment system 128 and the content server 132. In some versions, the media content 106 may include live streaming videos, such as from YouTube, Vimeo, Twitch, TikTok, or the like, as well as pre-recorded videos. Transmission of the videos may be accomplished by satellite, network, or the like. The videos may be provided through a web server or through third party systems.

Generally, the authoring tool 124 creates interactivity for objects 104 visually present in the media content 106 when the media content 106 is played. Creation of interactivity for objects may be as described in U.S. Pat. No. 10,477,287 or U.S. Pat. No. 11,032,626, both entitled "Method for Providing Additional Information Associated With an Object Visually Present in Media Content," the disclosures of which are hereby incorporated by reference, but is not limited hereto. Interactive elements 102 correspond to objects 104 visually present in the media content 106 and are established and defined by element parameters comprising a plurality of coordinates (such as X- and Y-coordinates) that define a shape and an object time corresponding to a duration that the shape is present at the coordinates. As one example, the interactive elements 102 may be defined by boxes or zones selected to correspond to the location or shape of the object 104 generally. Any number of adjacent boxes or zones may define the size and shape based on the object. The boxes or zones are based on grid coordinates. Using boxes or zones to define the object 104 allows for faster computations and identification of selection. One example of boxes or zones is disclosed in United States Patent Application Publication No. 2022/0167067, which is incorporated herein by reference.

Object metadata for the object 104 is established and associated with the interactive element 102. Illustrative examples of object metadata may include links for purchasing or reviewing additional information about the object 104. A landing URL may be input as object metadata to be available in response to triggering the interactive element 102. The authoring tool 124 creates the portable package such that when the portable package is accessed through the user device 114, the object metadata will retrieve information about the object 104. In one configuration, prior to the transmission of the media content 106, the system 100, through the authoring tool 124, creates the initial portable package or package file 148. Minimally, the initial portable package 148 includes an initial shape file 150 and any assets for the objects 104 that may be displayed.

The shape file 150 may include recorded element parameters, live element parameters, or combinations thereof. The shape file 150 may be modifiable. For instance, if there is a package update, the system 100 may parse the video element parameters for changes and add the same to the initial shape file 150, which may not be considered as a modified shape file 150. In this way, the initial portable package 148 may be replaced with the update. The initial portable package 148 also includes the content key identifier, which may be the recorded content key or the live content key. When the live content key is present, this indicates it is associated with the live event and the shape file 150 will have little or no assets. When the content key identifier is the recorded content key, the live event has been completed, and is now retrievable as recorded media content, or recorded media content that was not streamed or transmitted as a live event initially. Thus, any recorded video content may not be present in the initial portable package 148 and the initial portable package 148 may be replaced at the conclusion of the live event with the recorded portable package.

The authoring tool 124 is typically a software program that is operating on an editing device, such as a computer, desktop or laptop, or tablet or the like. The editing device may be in communication with a transmitting system and a video capture system, if necessary. The authoring tool 124 utilizes an encoding engine (not shown), such as a video encoding engine, to encode or format the media content 106 to a standardized media type in which is compatible across a number of platforms. The authoring tool 124 may also encode the video file into various formats to match the video format requested by the device and the device specifications. Each of these formats are designed to adapt to the requirements of a calling application, i.e., if the calling application is a web browser or a mobile application on the user device 114. In some configurations, the video may be streamed to the user device 114 and tuned to progressively, or in-stream, encode the video playback, and adapt to very latent data transfer conditions, allowing for smooth video display/interactivity. Examples of the video formats encoded into four deployment types are: 1) web/desktop, 2) web/desktop alternate (for legacy), 3) mobile responsive, and 4) mobile alternate (for legacy). It is to be appreciated that mobile responsive includes, but is not limited, the user device 114 accessing the media content 106 and the interactivity through any of a browser, a player, or an application on the user device 114. Mobile responsive is capable of adapting its content based on the user device 114 that the media content 106 is being viewed on.

The media content 106 is loaded into the authoring tool 124 at a default resolution for creating the interactive elements 102 regardless of the native video resolution. This creates a 1:1 correspondence for a coordinate grid 164 between the authoring tool 124 and the user device 114. Next, the interactive elements 102 are defined based on element parameters, such as location and time for objects present in the media content 106. The element parameters are saved at this 1:1 correspondence for each of the desired objects in the media content 106. Other configurations are contemplated. According to one illustrative method, in order to create the interactive elements 102, an origin is established whereby the authoring tool 124 may measure each point and the relative distance from the origin. It will be appreciated that the origin may be any consistent location and may be the identifiable feature 116. Coordinate information for points may be used to scale shape coordinates to adapt to different conditions specified by the user device 114. One such example of scaling is disclosed in U.S. Pat. No. 11,032,626, which is incorporated herein by reference. In some configurations, in order for the interactive elements 102 to correspond with objects 104 when viewed through the user device 114, the interactive elements 102 may correspond to or be associated with the identifiable feature 116. For instance, in configurations wherein the identifiable feature 116 is the code displayed on the display 108, coordinate information for points may be based on location of the code relative to the objects 104 in the media content 106. When the identifiable feature 116 is a logo, so long as the logo remains in the field of view of the image capture device 118, the coordinate information may be determined when a selection is transmitted.

In order to ensure interactivity capabilities, the coordinate information scales for different types of and differently sized user devices 114 and/or playback applications. As mentioned above, the user device 114 loads and executes the package file to display and/or play the interactive content. It is to be appreciated that the user device 114 may load and execute the package file in a viewer application, a player, an applet, or software as is well known to those having skill in such arts. In other words, the user 110 may view the media content 106 through the user device 114 and access interactive content with the user device 114. Device information or parameters associated with the particular user device 114, i.e., user device information, are provided with the loading and executing of the package file. The device information or parameters may include the type of device that will display the interactive content and the device resolution that the interactive content will be displayed. In order for the interactive elements 102 to correspond with objects 104 when displayed according to the device parameters, the interactive elements 102 need to be scaled. The scaling of the interactive elements 102 based on the user device 114 allows for continued interactivity. Thus, the device parameters drive the scaling of the interactive elements 102 to correspond to the user device 114 parameters. In certain embodiments, to improve computational speed and reduce demand for resources, the scaling of the interactive elements 102 happens in response to the selection. In other words, after the selection is received, then the interactive elements 102 are scaled. In addition to the device parameters, the image capture device 118 provides incoming scale parameters that ensure the proper scaling of the interactive elements 102. It will be appreciated that there may be multiple objects 104 in the media content 106. In this case, there may be a plurality of interactive elements 102 that correspond to each of the objects 104.

In addition to encoding, after the interactive elements 102 have been created, modified, linked and stored, the portable package, or package file, is created. The package file collects the element parameters for each shape for the interactive elements 102 corresponding to the desired objects 104 in the video file, which may be stored as representative code. The code may be any suitable format for allowing quick parsing through the established element parameters and for embedding with the industry standard specifications for the user device 114. However, the element parameters may be captured according to other suitable methods. It is to be appreciated that the term "file" as used herein is to be understood broadly as any digital resource for storing information, which is available to a computer process and remains available for use after the computer process has finished. A separate package file is created for each unique media content 106 that is authored. The package file can be any available format that can be executed by the user device 114 or a viewer application server 144.

During package creation, the process creates object mapping for the portable package and is used in conjunction with interactive events, or selection events, to provide appropriate responses when the user requests information or when responding to the user selection. In one embodiment, such as with the live content key, an item recognition process (via artificial intelligence or predictive coding) creates shapes based on object recognition and is used in conjunction with events to center and follow shapes throughout the video. The item recognition process may also store shape elements and scans for the re-appearance of the shape. Item recognition may be used with recorded or live, but is most useful with live media content.

Figure 3:
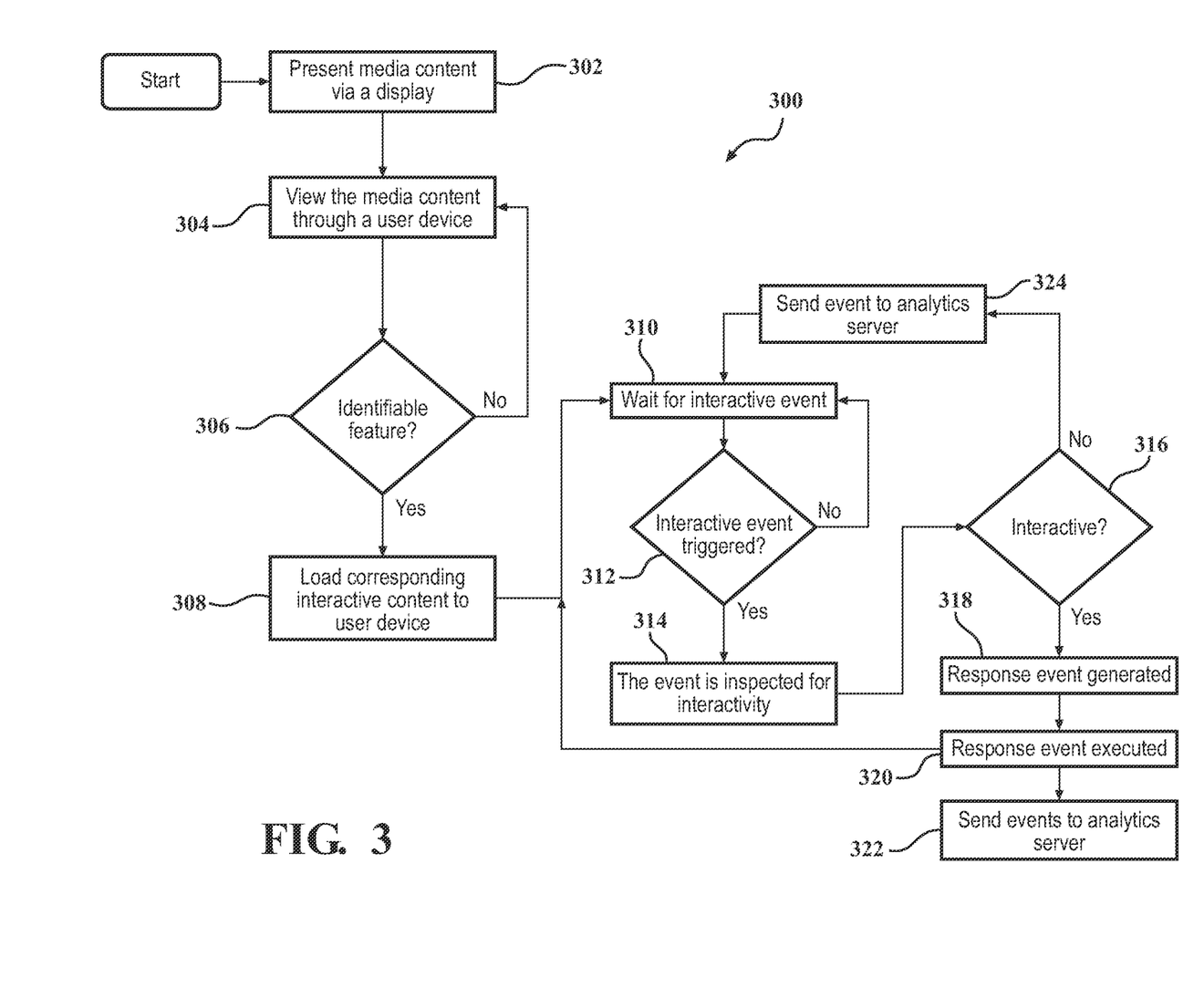
FIG. 3 is a flow chart of one configuration for accessing media content and enabling interactivity for objects appearing in the media content on the user device.

Referring now to FIG. 3, an exemplary method 300 is provided. In step 302, media content 106 is presented on the display 108, and in step 304, the display 108 including the media content 106 is viewed through the user device 114. Next, at step 306, the user device 114 determines whether the identifiable feature 116 is present, indicating that interactive content is available for the media content 106. As shown throughout the Figures, the identifiable feature 116 is a code 117. The code 117 may be any machine-readable code including, but not limited to, a QR code, a serial number, a UPC code, a barcode, an image, etc. In other configurations, the identifiable feature 116 may be based on any type of image including, but not limited to, symbols, icons, numbers, text, logos, drawings, etc. as well as be associated with any product and/or object including the size, shape, color, and the like of the product and/or object. The identifiable feature 116 may also include information related to time, location, weather, direction, and date associated with the media content 106. Here, the user 110 may align the user device 114 such that the display 108 is within the field of view of the image capture device 118 (e.g., a camera) and displayed through the output peripheral 121. As mentioned above, one or more identifiable features 116 may be detectable by the user device 114 to indicate to the user device 114 that interactive content is present in the media content 106.

At step 308, if the identifiable feature 116 is present, the portable package system 126 sends the package file 148 associated with and corresponding to the media content 106 to the user device 114. The user device 114 activates a web browser or a mobile application to present the interactive content or media content 106 including the interactive content. Here, the user device 114 loads the corresponding interactive content such that the interactive content is displayed to the user 110. In some configurations, the interactive content may be overlaying the media content 106 as the media content 106 is being viewed through the camera 119. For example, the user device 114 may activate the mobile application with the interactive content being displayed within an overlay that substantially overlays the media content 106 as the media content 106 is within the field of view of the camera 119 and shown on the screen of the user device 114. In another example, the user device 114 may activate a web browser to present the interactive content or media content 106 including the interactive content.

Once the interactive elements 102 associated with media content 106 are available to the user 110 through or on the user device 114, in step 310, the system 100 waits for the interactive event, such as the selection event. The selection event comprises a selection coordinate and a selection time. The user device 114 that displays the interactive content to the user 110 may employ various forms of allowing the user 110 to interact. For example, the user may select, click, touch, voice activate, or any other suitable interaction representing the intent of the user 110 to interact with the object 104. Once the selection event is received from within the user device 114 that comprises the selection coordinate and the selection time, the portable package is parsed to determine whether the selection time corresponds to the object injection time. If the selection time corresponds with the object time, the portable package is further parsed to determine whether the selection coordinate is within the selected zones or object coordinates, if so, then object metadata is retrieved such that additional information is displayable to the user 110 on the user device 114. Because the user device 114 may have a small output peripheral 121 (screen), an object tolerance may be provided about the interactive element 102 to determine if the selection event corresponds to the interactive element 102 for the object 104. The object tolerance could be a 10% or more increase of the shape for the element parameter. Another example is the object tolerance is a 15% or more increase of the shape. Alternatively, the object tolerance may be from 5-30 pixels. Another embodiment has the object tolerance of 10-20 pixels and yet another tolerance is 15 pixels. By providing the object tolerance, the system 100 provide click sensitivity when the user 110 attempts to select the object 104.

Figure 7:
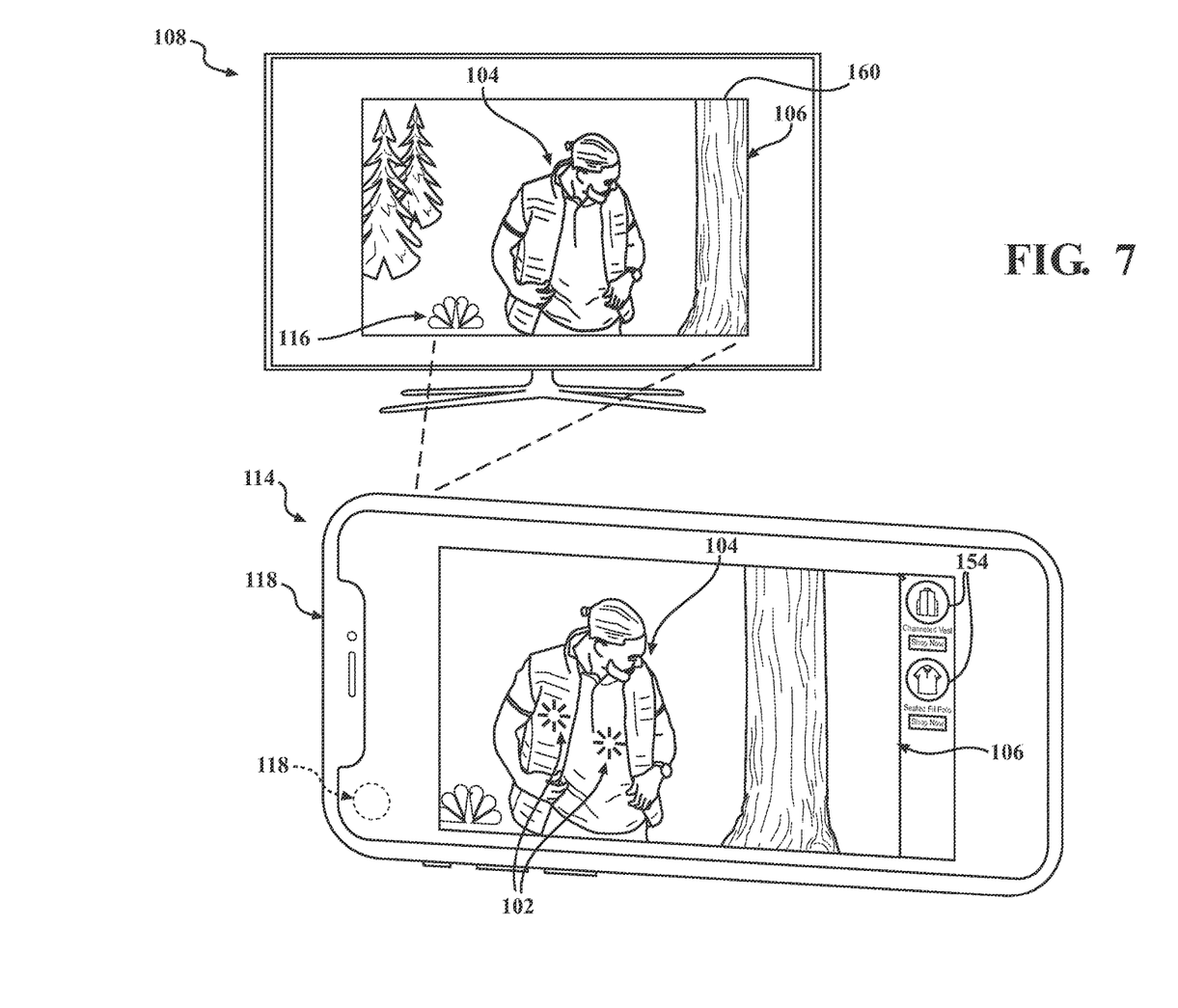
FIG. 7 is a schematic representation of yet another configuration of a display showing media content and the user device accessing the media content having interactivity enabled and objects having been selected.

The system 100 may further translate the coordinate of the selection event based on dynamically capturing less than the entire field of view or if the captured media content 106 is skewed relative to the image capture device 118. As discussed above, FIG. 6 illustrates one embodiment where the image capture device 118 of the user device 114 has the boundary box 162 for aligning the media content 106 on the display 108 therein. FIG. 7 illustrates another embodiment where the media content 106 is offset in the image capture device 118 of the user device 114. The offset may occur as a result of the image capture device 118 being misaligned or it may be skewed because it is angled relative to the display 108. It may also occur if the user device 114 is moved closer or farther away from the display 108 as the media content 106 is being captured. In both embodiments, since the location of the identifiable feature 116 is known, and the element parameters are known, if the field of view of less than the entire display 108, offset, or skewed, the system 100 can translate the selection coordinates based on any difference from and location of the identifiable feature 116. Then, it can be determined whether the selection event corresponds to the interactive element 102. Referring specifically to FIG. 7, even though approximately half of the display 108 is captured in the image capture device 118, the system 100 is still able to provide interactivity for the objects 104 because it translated, or shifted, the coordinates relative to the location of identifiable feature 116.

The user device 114 determines whether the interactive event was triggered at step 312. In some configurations, the overlay is a layer that detects the interactive event from the user. The overlay may not be visible to the user. The interactive event is inspected for interactivity at step 314. The interactive event parameters may be compared to the element parameters and recorded utilizing any suitable means of comparison. For instance, a comparison program may be used for comparing the received interactive event parameters to the contents of an initial, modified, or final shape file 150 having the parameters encoded therein. If any interactive events are detected, the location and timestamp of the interaction are logged as the selection event. If the logged interactive event is located inside the shape associated with the object 104 or corresponds to the object 104 based on the coordinate grid 164, the corresponding object information is processed. It will be appreciated that the coordinate grid 164 may be any size, contain any number of cells, and the like. The coordinate grid 164, although described in part with the authoring tool, may also be used on the user device 114 for determining if interactive elements 102 are selected. In this manner, even though differences between the coordinate grid 164 on the authoring tool and on the user device 114 may exist, the coordinate grid 164 may be used without deviating from the subject invention. Alternatively, the coordinate grid 164 may be two different grids, one for the authoring tool and on for the user device 114. Overall, the coordinate grid 164 defines location the shapes to determine if selected. If the interaction is within a shape, zone, or area configured to be selectable, as in step 316, the corresponding object information events are processed, and a response event is generated in step 318 and executed in step 320. Here, the user 110 may access information about the object 104. If no corresponding object information is found, nothing is processed. The interactive event, along with any resulting event information, may be accumulated and eventually transmitted back to the analytics system 122, in steps 322 and 324. The analytics may be provided to an appropriate third party or the package server 112.

Figure 4:
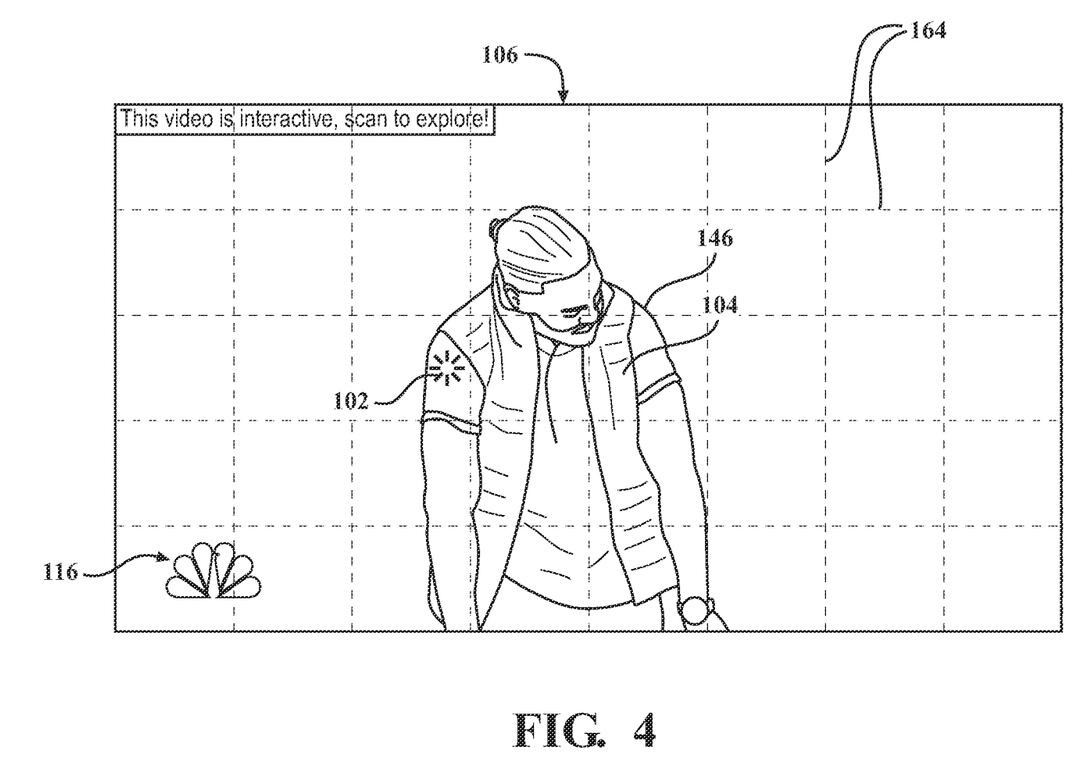
FIG. 4 is a schematic representation of one configuration of media content as shown on a separate display with a prompt to indicate interactivity availability on the user device.

Referring now to FIGS. 4 and 5, the display 108 displays the code 117 provided on the display 108, which is scanned or captured with the user device 114. Once the user 110 scans the code 117, from within the user device 114, the media content is displayed through and/or on the user device 114. The user device 114 may treat the media content 106 as a live video. It will be appreciated that in this configuration, the live video may be a live stream, a pre-recorded video playing the video live with the media content being displayed, or combinations thereof. Said differently, the media content 106 being displayed may be a pre-recorded video but is being displayed live such that it is being received by the user device 114 as if it was a live video. Typically, if it is a live video, there will be no pre-existing shape file or an empty shape file for the objects 104, so the system 100 will attempt to automatically define the shapes for the objects 104, as described above, if using artificial intelligence or predictive coding.

As mentioned above, the user 110 selects the objects 104 on the user device 114. For instance, the system 100 may automatically identify the interactive elements 102 to correspond to the shirt and vest the actor 146 is wearing. The user 110 may select the location of the shirt to receive information 154 about the shirt. In some versions, information 154 may include where the user 110 may purchase the shirt. In one embodiment, when the location selected corresponds to the interactive elements 102, information 154 related to the object 104 is presented along with the media content 106 such that the view or display of the media content 106 is unobstructed. For instance, as shown in FIG. 5, the information 154 is shown to the right side of the media content 106. In some configurations, the information 154 may be shown overlaying the media content 106. The information 154 related to the object 104 selected may include what object 104 was selected, when an object 104 is selected, and how many times an object 104 is selected. The method 300 may employ any suitable technique for collecting such data and/or information 154. For example, the method 300 may analyze the database and extract data related to element parameters, additional information linked to element parameters, and recorded selection events made in relation to particular element parameters.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A method for enabling interactive content on a user device for objects appearing in media content captured through an image capture device of the user device, said method comprising the steps of:
   providing a portable package that is associated with the media content, the portable package including at least one shape file to receive interactive elements corresponding to objects visually present in the media content and object metadata that is associated with the interactive element;
   identifying an identifiable feature that is associated with the media content and that is in a field of view of the image capture device;
   receiving a request for the portable package that is associated with the media content in response to identifying the identifiable feature;
   delivering the portable package to the user device based on the request;
   receiving a selection event that occurred on the user device that includes a selection time and a selection coordinate;
   parsing the shape file to determine whether the selection event corresponds to any interactive element; and
   retrieving the object metadata if the selection event corresponds to the interactive element so that additional information for the object is displayable to the user on the user device.

2. A method as set forth in claim 1 further comprising the step of dynamically capturing the field of view from the image capture device to compensate for movement of the user device while the media content is captured.

3. A method as set forth in claim 2 wherein the step of dynamically capturing the field of view is further defined as analyzing less than an entire field of view provided by the image capture device.

4. A method as set forth in claim 3 wherein the step of parsing the shape file further comprises the step of translating the selection event based on dynamically capturing less than the entire field of view to determine if the selection event corresponds to the interactive element.

5. A method as set forth in claim 2 wherein the step of dynamically capturing the field of view is further defined as analyzing no more than ninety percent of the field of view provided by the image capture device.

6. A method as set forth in claim 2 wherein the step of dynamically capturing the field of view is further defined as focusing on a portion of the field of view provided by the image capture device.

7. A method as set forth in claim 1 further comprising the step of identifying a location of the identifiable feature relative to a coordinate grid for parsing the portable package.

8. A method as set forth in claim 7 wherein the interactive element is defined by element parameters comprising a plurality of (X, Y) coordinates that define a shape and further comprising the step of shifting the element parameters for the interactive element based on the known location of the identifiable feature.

9. A method as set forth in claim 8 wherein the portable package further comprises a 1:1 correspondence between a coordinate grid at a default resolution and the coordinates of the element parameters and further comprising the step of receiving user device information including at least one of a type of the user device, a device orientation, a device resolution or combinations thereof and scaling the element parameters for the interactive elements based on the user device information and the coordinate grid.

10. A method as set forth in claim 1 wherein the step of parsing the shape file to determine whether the selection event corresponds to the interactive element is further defined as providing an object tolerance about the interactive element to determine if the selection event corresponds to the interactive element.

11. A method as set forth in claim 1 wherein the step of identifying the identifiable feature further comprises the step of analyzing the field of view presented from the image capture device for a boundary of the media content and identifying a location of the identifiable feature within the boundary.

12. A method as set forth in claim 11 wherein the step of parsing the shape file is further comprises the step of translating the selection event based on the location of the identifiable feature relative to the boundary to determine if the selection event corresponds to the interactive element.

13. A method as set forth in claim 1 further comprising the step analyzing the field of view presented from the image capture device for at least one portion of a boundary of the media content.

14. A method for enabling interactive content on a user device for objects appearing in media content captured through an image capture device of the user device, said method comprising the steps of:
   providing a portable package associated with the media content including at least one shape file to receive interactive elements corresponding to objects visually present in the media content and object metadata that is associated with the interactive element;
   analyzing a field of view presented from the image capture device for at least one portion of a boundary of the media content;
   identifying an identifiable feature that is visible in a field of view of the image capture device and that is associated with the media content;
   determining a location of the identifiable feature relative to the at least one portion of the boundary of the media content;
   receiving a request for the portable package that is associated with the media content in response to identifying the identifiable feature;
   delivering the portable package to the user device based on the request;
   receiving a selection event that occurred on the user device that includes a selection time and a selection coordinate;
   parsing the portable package to determine whether the selection event corresponds to any interactive element, wherein parsing the shape file includes the step of translating the selection event based on the location of the identifiable feature relative to the boundary to determine if the selection event corresponds to the interactive element; and
   retrieving the object metadata if the selection event corresponds to the interactive element so that additional information for the object is displayable to the user on the user device.

15. A method as set forth in claim 14 wherein the step of determining the location of the identifiable feature is further defined as determining the location of the identifiable feature relative to a coordinate grid for parsing the portable package.

16. A method as set forth in claim 14 further comprising the step of dynamically capturing the field of view from the image capture device to compensate for movement of the user device while the media content is captured.

17. A method as set forth in claim 14 wherein the step of parsing the portable package to determine whether the selection event corresponds to the interactive element is further defined as providing an object tolerance about the interactive element to determine if the selection event corresponds to the interactive element.

18. A method as set forth in claim 17 wherein the object tolerance is at least one of based on an increase in a size of the interactive element or an increase in a number of pixels about the interactive element.

19. A method as set forth in claim 14 wherein the interactive elements are further defined by as a shape comprising grid coordinates forming a shape to represent the location of the object.

* * * * *